Figure 1:
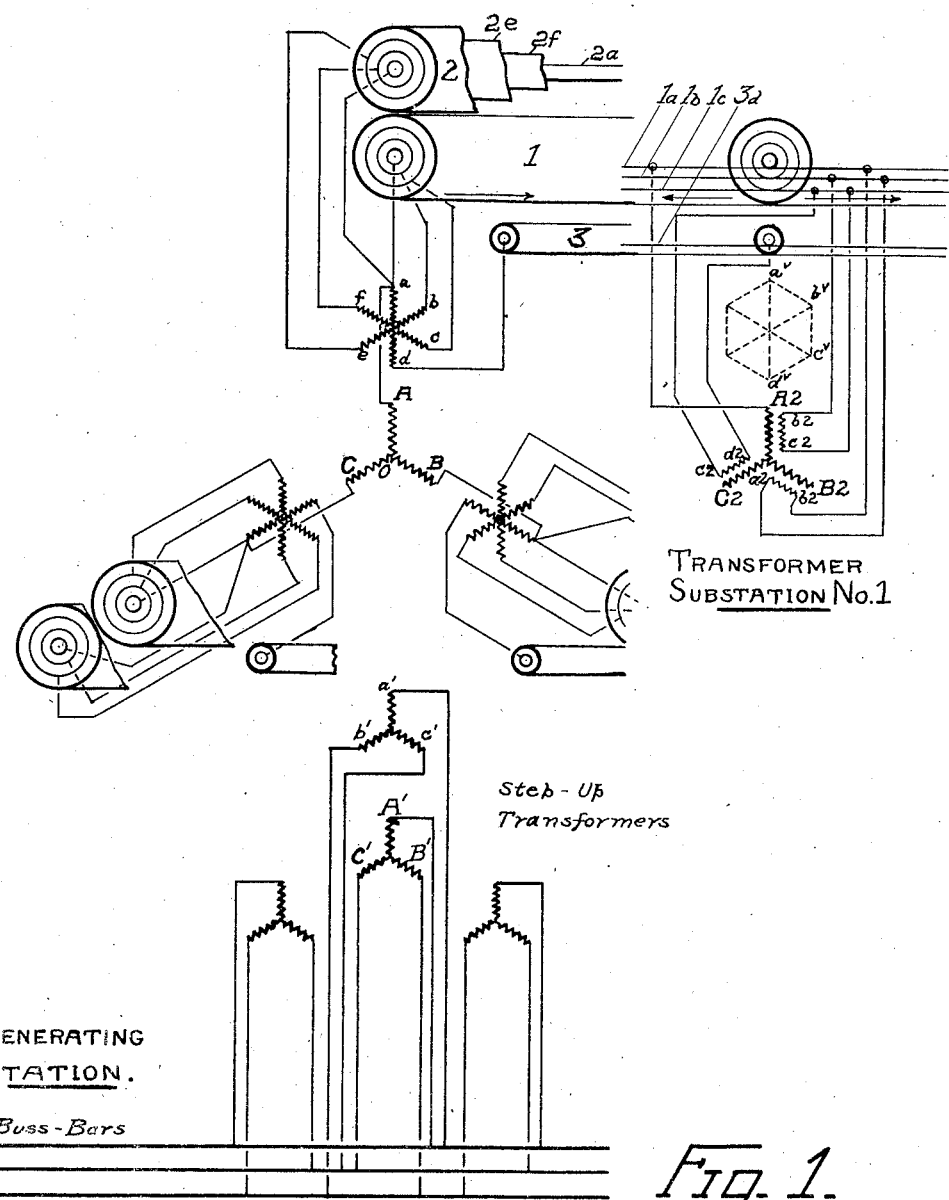

Aug. 28, 1923. 1,466,069
A. M. TAYLOR
MEANS FOR AND METHOD OF REDUCING CAPACITY CURRENT LOSSES IN
ELECTRIC CABLES
Filed April 7, 1923 2 Sheets-Sheet 1

Inventor
ALFRED MILLS TAYLOR
By Harold C. Thome
Attorney

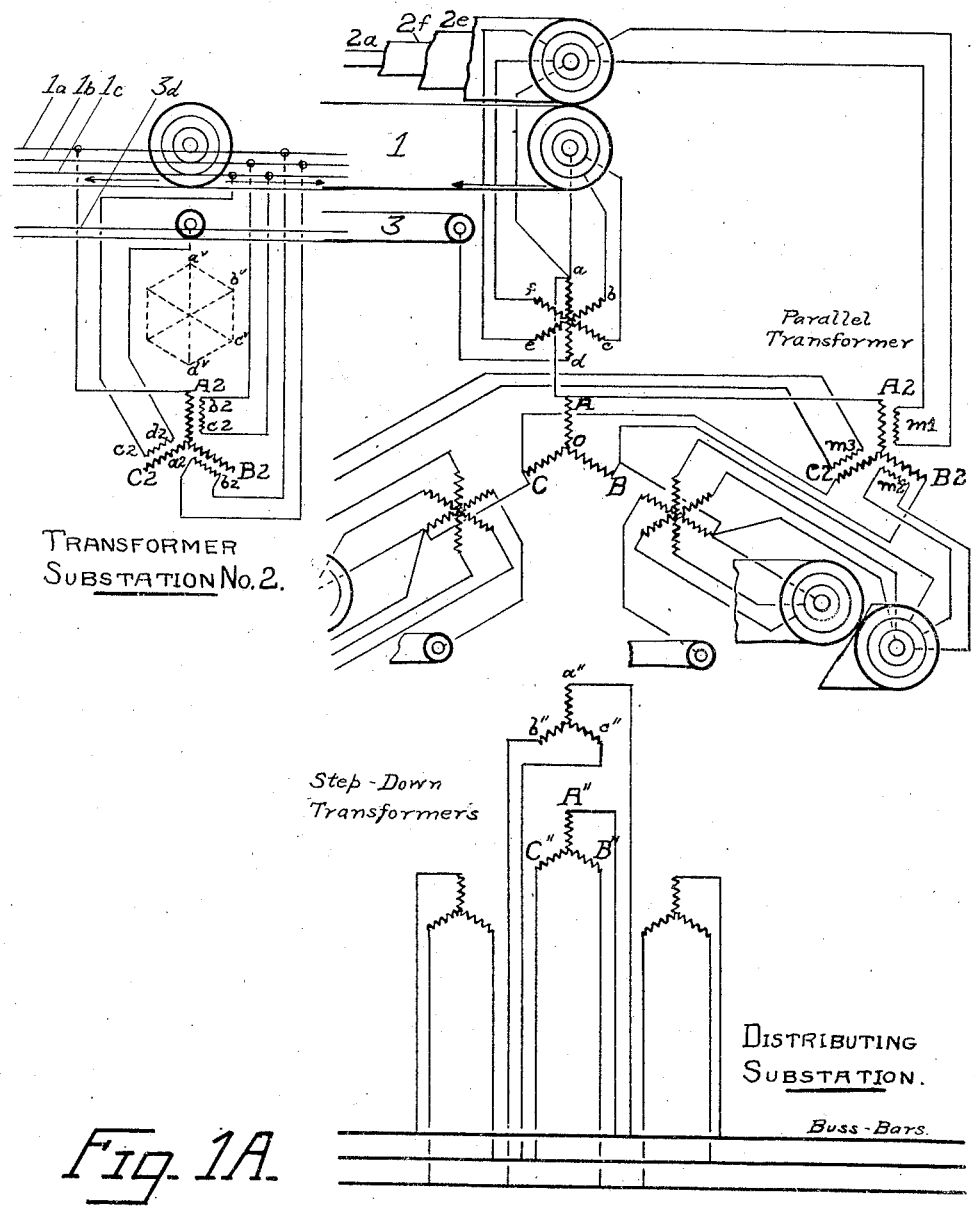

Patented Aug. 28, 1923.

1,466,069

UNITED STATES PATENT OFFICE.

ALFRED MILLS TAYLOR, OF BIRMINGHAM, ENGLAND.

MEANS FOR AND METHOD OF REDUCING CAPACITY-CURRENT LOSSES IN ELECTRIC CABLES.

Application filed April 7, 1923. Serial No. 630,590.

*To all whom it may concern:*

Be it known that ALFRED MILLS TAYLOR, a subject of the King of England, residing at Erdington, Birmingham, England, has invented certain new and useful Improvements in Means for and Methods of Reducing Capacity-Current Losses in Electric Cables, of which the following is a specification.

In polyphase electric transmission systems employing concentric underground cables of extreme length, and in which the pressure employed on the central core is the very highest available on the system, the supplying of the capacity current requisite for the charging of the cables during their normal working is a matter of considerable difficulty, particularly in those systems as in the present inventor's British Patent No. 170619 of 12th June 1920, in which two triple-concentric cables are employed, the central cores being worked at higher pressures above earth than the intermediate and outer cores, or in those systems such as in the present inventor's British Patent No. 183964 of 25th May 1921, in which the innermost, intermediate and outermost cores are connected respectively with the extreme, intermediate and penultimate tappings of a single-phase transformer constituting part of a three-phase system, in which again the innermost cores are subjected to the higher pressures to earth and the intermediate and outermost to lesser pressures.

In such systems, the capacity currents to be furnished across the successive rings of insulation are in the nature of things much greater for the outer rings than for the inner rings, because the capacity is greater, assuming that equal voltages are employed across the successive dielectrics. Moreover —and this is particularly the case in such systems as the present inventor's British Patent No. 183964—in addition to the capacity current which has to be fed through the outer cores being very much larger than that required for the innermost core, or cores, the voltage under which this is transmitted, counted from the neutral point of the system, is less and less, so that the percentage of loss of "regulation" becomes worse and worse.

The object of the present invention is to find a means of passing to the distant substation, through the central core, at the maximum pressure available, the capacity kilovolt-ampere-energy required for the excitation of, say, all the cores of the distant half of a long line, and the feeding back of this energy from the said substation, after transformation, through the different cores towards the generating station, and, if found desirable in a direction away from the generating station on the other side of the said substation, with the object of further increasing the distance of transmission.

In other words, say, for instance, that any particular outer core of a cable required a charging current of 200 amperes per 20 miles at a comparatively low pressure, it would obviously pay to pass 100 amperes outwards from the generating station for 10 miles at the pressure required, and to pass a greatly reduced current at a much increased pressure through the central core to the substation, and to feed back after transformation the 100 amperes from that substation at the lower voltage, rather than to pass the whole 200 amperes at the lower voltage from the generating station outwards for the whole line.

This is merely an adaptation of a well-known case of distribution such as is continually being encountered in such schemes as the feeding into a long railway line of current at frequent intervals, where it is always the practice to transmit the current at the high pressure and feed it backwards and forwards at the low pressure at numerous feeding points.

A certain measure of difficulty is, however, found in forcing the energy for the said line excitation to travel from the generating station through the central core to the substation as the passage of the necessary capacity excitation current for the transformer through the resistance of the line necessarily involves a drop in voltage; and if an auto-transformer were employed, at the substation, for the purpose a considerable portion of the energy which it was desired to transmit through the central core would find it easier to flow simply from core to core outwards, thus charging the cores, and so getting back to earth without entirely passing along to the substation, in which case the benefits which it is desired to confer would only be partially realized.

It is, however, a known fact that if two transformers are connected in parallel circuit on to a load which is partly non-inductive and partly a capacity load, and if in the secondary one of these transformers inductance be introduced, the transformers will no longer share the load equally but one of them will select the capacity load and the other the non-inductive load. Moreover, the passage of a current having a leading power factor through an inductance inserted in the secondary circuit of a substation transformer will tend, other things being equal, to raise the external voltage of the secondary of that transformer, and it will therefore feed back into the line and supply the capacity current.

In the two sheet drawing, Figures 1 and 1$^A$ disclose a diagrammatic representation of a transmission system to which this invention has been applied.

A description of the arrangements proposed as applied to the circuit arrangements of the present inventor's British Patent No. 170619 will now be described; and, this being the more difficult case to follow, it will be assumed that the description applies equally well and in a simpler way to the circuit arrangements indicated by the present inventor's British Patent No. 183964.

The drawing shows a general outline of the arrangement of transformers at the generating station and the apparatus required to effect the passage of the capacity current along the central cores of a portion of the cable system and to transform and distribute it into the outer cores, feeding both ways from various points, at an indefinite number of points along the line; two transformer substations with apparatus for thus effecting this transformation and distribution of capacity current, together with a vectorial representation of the potentials obtaining on the different intersheaths along the line are illustrated. A receiving and distributing substation at an end of the line is also shown together with the additional transformer for effecting the transformation and distribution of capacity current in accordance with this invention.

Referring now in detail to the drawing, the concentric circles represent the cores of the various cables connected with the phases of a system of transformers constituting a major star transformer A, B, C, and subsidiary 6-phase transformers $a$, $b$, $c$, $d$, $e$, $f$, disclosed in Figure 4 of the drawing in the present inventor's Patent No. 170,619.

The diagram purports to show all the principal elements of the system. The generators themselves at the generating station are not shown, but the 3-phase bus bars are shown at the lower left-hand side of diagram; it will be understood that the generators feed into these bus bars, and from which there may of course be numerous circuits for local distribution at the lower pressure. At the distributing substation, at the right-hand side of the diagram, there are similar low-tension 3-phase bus bars.

Closely adjacent to the generator bus bars are shown the three small three-phase/six-phase transformers having primaries $a'$, $b'$, $c'$, connected with the bus bars, as well as the larger 3-phase transformer having its primaries A′, B′, C′. The topmost small transformer $a'$, $b'$, $c'$, feeds the topmost "hexagon" $a$, $b$, $c$, $d$, $e$, $f$, the secondary windings. The big transformer A′, B′, C′, feeds into the star-connected secondary A, B, C, forming the uniting point of the three "hexagons."

Six 3-core cables and three single-core cables, which latter would be converted into a 3-phase cable of the ordinary type, are employed for the transmission line, and it will be noticed that from the terminal $a$ of the topmost "hexagon" two conenctions are taken, each leading to one of the central cores, 1$^a$ and 2$^a$ of the cables 1 and 2 fed by the said "hexagon." From the terminals $b$ and $f$ of the "hexagon" connections are made to the intermediate cores 1$^b$ and 2$^f$ of the two cables, and from the terminals $c$ and $e$ of the "hexagon" connections are carried to the exterior cores 1$^c$ and 2$^e$ of the two cables. From the free end $d$ of the "hexagon" a connection is carried to the topmost small single-core cable 3,—3$^d$.

The above arrangements are repeated on the other two pairs of principal cables. Precisely similar arrangements obtain in the distributing substation wherein the step-down transformers feed into secondaries A″, B″, C″, and $a''$, $b''$, $c''$, etc., which are connected with the substation bus bars, except for the added set of transformers for capacity current distribution, which are to be described later.

By following out the connections, it will be understood how, for instance, the load current, starting from the terminal $f$ at the step-up end, finds its way through the intermediate core 2$^f$ of the topmost cable 2 to the corresponding terminal $f$, on the receiving transformer "bank"; thence it passes acrsos to $c$, and then back through the outermost core 1$^c$ of the cable 1, and so back to the generating station where it is conducted to the terminal $c$ of the bank $a$, $b$, $c$, $d$, $e$, $f$. This circuit forms a complete and independent circuit, and in a similar do the other circuits of the transformer bank at the sending end operate. As, however, the electromotive-force generated between $c$ and $f$ in the sending bank is practically only equal to, strictly somewhat greater than, that in the topmost limb of the big transformer A, B, C, viz:— O—A, it follows that this E. M. F. is only 1/.73 of the E. M. F. between lines, the point A being intended to directly coincide with the point $a$ and the length of O—A being roughly equal to the length of d—a Thus far the arrangements described are identical with the British Patent No. 170619. These arrangements are an enormous improvement on all arrangements for electrifying the outermost core of a 3-core cable hitherto employed, in that the load currents are passed at greatly-increased voltages; but in extremely long lines it is found that the capacity current obtaining between the outermost core and the lead sheathing of the cable is so serious that poor regulation would be involved if some different means were not devised to overcome this difficulty. The object of the present invention is to provide these means.

The capacity current for the intermediate and outer cores of the cables is not all delivered to them from the generating station but may be passed therefrom through the central cores of the cables and transformed and distributed to the outer cores from the distributing substations, and from intermediate points along the line as well.

Between the generating station and distributing station are shown two substations for feeding in the capacity current into the line represented by star-connected transformers $A^2$, $B^2$, $C^2$, whose primary windings for the particular phase considered, viz:—phase $A^2$, are in each case connected on to the central core of either of the two cables 1 or 2 since both of the central cores are at the same potential, and also separate transformers, not shown, for carrying such load as may be necessary can be installed at these substations. The other two phases $B^2$ and $C^2$ of each of these transformers, as well as of the transformer at the generating station, would also be connected to two other 6-phase systems and four other cables.

It may be stated here that the hexagonal figures bearing reference characters $a^v$, $b^v$, $c^v$, $d^v$, are vector diagrams showing in well known convention the magnitudes and phases of the voltages at which the corresponding cable conductors operate in accordance with the transmission system of the British Patent No. 170,619.

Considering the present cables as so operating, it will be seen that, by suitably selecting the lines to which the secondary circuits will deliver current, the currents can be delivered to these lines in the right phase. For instance, at the intermediate substation, the phase between the central core $1^a$ and the next core to it $1^b$ is represented by the inclination of the dotted line $a^v$—$b^v$ in the dotted "hexagon" associated with this substation; and it will be seen that the right-hand bottom phase of the primary of the "capacity transformer" $A^2$, $B^2$, $C^2$, at this substation has its secondary $a^2$—$b^2$ connected so as to feed into the said two cores, while the top phase of the said transformer has its secondary $b^2$—$c^2$ connected to feed into the intermediate and outermost cores, the phase of which is in accordance with the dotted line $b^v$—$c^v$ in the "hexagon" just referred to; while, again the left-hand bottom phase of the above primary has its secondary $c^2$—$d^2$ connected between the small single-phase conductor $3^d$ of the cable 3 shown below and parallel with the principal 3-core cable 1 and the outermost core $1^c$ of the latter cable, the phase again being in correspondence with the slope of the dotted line $c^v$—$d^v$ of the aforesaid "hexagon."

In this way the current is arranged to be fed into each of the outer cores of the cable so that it emerges in two directions from said substation, as shown by the arrows drawn parallel with the core $1^c$.

Two additional sets of secondary windings, not shown on the diagram, would be wound over each of the primary limbs, and these secondary windings would deliver current into suitable cores on the other two systems of cables in connection with the main phases B and C of the major star step-up transformer at the generating station.

At the distributing substation, likewise is located a transformer $A^2$, $B^2$, $C^2$, similar to those shown at the intermediate substation just described. This transformer is connected in parallel with the load transformer A, B, C, and is provided with secondary windings $m^1$, $m^2$, $m^3$, which deliver current between the intermediate and outer cores of cable 2 and corresponding cores of the cables of the other two phases of the major star A, B, C. To perform the various operations on all six of the triple cored cables, several sets of secondary windings will of course be required on each limb of the transformer $A^2$, $B^2$, $C^2$. Now this transformer works under the full line voltage; hence, the capacity current energy has been transferred through the central core of the cable at the full voltage to the substation, and has been there stepped down to the lower voltage and phase required for energizing any particular pair of cores of the cable. The capacity currents actually lead over these phase relationships by 90 degrees, as is well known, but the description is not complicated by a reference to this feature.

It should be observed that for the sake of simplicity in the explanation the effect of the outer lead sheath of the principal cable being earthed, as well as that of the smaller cable, has been neglected. The potential of the earth in the system shown may by suitable and well known grounding arrangements be adjusted at will; it would probably occur at a point three-quarters of the way between $a$ and $d$ on the "hexagon" shown at the generating station, and two voltages would properly have to be considered instead of the simple voltage c—d; for example:—a voltage between the said point and the point d, and another voltage nearly in quadrature with it, between the said point and the point c. Alternatively, the point d may be considered to be at earth potential for the purposes of the diagram, but in this case of course the small single-core cable shown is really unnecessary.

A special feature of these capacity transformers A², B², C², has yet to be noted. It will be realized that, since the capacity current and the load currents both flow along the same central cores of the cables, if the capacity transformer were merely identical in construction with the load transformer they would both tend equally to draw both load current and capacity current from the line and there would be no tendency to induce the capacity current for the distant parts of the line, i. e., the parts approaching the substation, to pass along intact through the central core, but they would flow from the central conductor to the intermediate conductor, and from the intermediate conductor to the outermost conductor, and from the latter to earth, thus causing a large volume of current to be sent out from the generating station, and defeating to some extent the end aimed at. To give the best results, therefore, a stimulus is desirable to cause the capacity currents to flow to the substation before being fed back into the outer cores of the line. This stimulus is provided by winding the capacity transformer in such a way that it has a greater reactance than the load transformer. The capacity current traversing this reactance increases the magnetization of the core of the transformer, and as it were "boosts" up the E. M. F. of the secondary of the capacity transformer, causing the E. M. F. between, for instance, the intermediate core and the outermost core to be actually higher, if desired, at the substation end of the line than it is at the generating station end; the result being that the capacity current is fed backwards from the substation until the drop in potential caused by its own flow causes it to be equal to the E. M. F. of the capacity current sent out from the generating station.

It is of course immaterial whether the charging current required for the central core itself be fed back from the substation or not; in fact it is possible that it might be in opposition in the former case to the actual bulk of the capacity current in the central core. Since, however, the capacity current required for the central core is much smaller than, and is in series with, the capacity currents for the outer cores, from which it flows to the lead sheathing, it is obviously no disadvantage to allow this current to pass through the dielectric to the intermediate core, thence through the next dielectric to the outermost core, and thence to the lead sheathing, because this element of current is all furnished at the extreme voltage of the transmission, and that which flows through to the lead sheathing simply relieves the more distant part of the line from carrying that portion of the charging current to the distant substation and being there re-transformed and paid back into the outer sections of the line. To that extent, of course, it reduces the size of the transformer necessary at the distant sub-station; which is also a good feature.

Having now particularly described and ascertained the nature of my said invention, and in what manner the same is to be performed, I declare that what I claim is:

1. In multiple voltage high tension alternating current transmission systems comprising concentric conductors in which the central cores are fed from a source at higher voltage than the surrounding concentric cores, the method of maintaining at a low value the exciting current supplied by the source which comprises transmitting at the highest voltage the apparent power required for the excitation of the distant parts of the cable system to a distant point, transforming at said point the said apparent power to the voltages required, and feeding back therefrom the charging current into the various cores of the cables.

2. In multiple voltage high tension alternating current transmission systems comprising concentric conductors in which the central cores are fed from a source at higher voltage than the surrounding concentric cores, transformers connected with the conductors for carrying the load current and separate transformers having a different degree of reactance from the first said transformers whereby the capacity current is differentiated out from the load current and fed back into the line from said transformers.

3. A high-tension alternating-current system comprising step-up transformers with a source of electrical energy supplying current thereto, multi-cored transmission cables connected therewith, step-down transformers for the load current and capacity current connected with said cables at points beyond said step-up transformer wherein the secondary windings are suitably wound in order to obtain the correct phase relations between the currents carried by the cores of the various cables and for supplying charging currents into the cores of the cables so as to be fed backwards from these transformers toward said step-up transformer and forward along the cables.

4. A multiple voltage high-tension alternating-current transmission system comprising concentric cored cables and a source of electrical energy supplying current thereto, the highest potential being imposed upon the central cores of the cables whereby the greatest differences in potentials exist between the central cores of the cables, and a transformer at each substation having its primaries connected with the central cores of the cables and highly inductive secondaries connected with the outer cores for supplying charging current to the outer concentric cores from said central cores at reduced potentials.

5. In a multiple voltage high tension alternating current transmission system including conductors having different capacities and a source of electrical energy for supplying current thereto, the highest potentials being imposed upon the conductors having the lowest capacities, transformers connected with said conductors for carrying the load current, and separate transformers having a different degree of reactance from the first said transformers whereby the capacity current may be differentiated out from the load current and fed back into the various conductors.

6. In multiple voltage high-tension alternating-current transmission systems, comprising concentric cored cables and a source of electrical energy supplying current thereto, transformers connected with said cables at the generating station for supplying current to them so that the cores of the cables are working at different potentials, transformers connected with said cables at substations and having highly inductive windings thereon corresponding with the phases between the cores of the cables, and connections between the windings of said transformers at the substations and the various cores of said cables for supplying them with charging current.

7. In multiple voltage high-tension alternating-current transmission systems, comprising triple concentric cored cables and a source of electrical energy supplying current thereto, transformers connected with said cables at the generating station for supplying a high voltage to the innermost cores and respectively lower voltages to the intermediate and outer cores of the cables whereby the greatest differences in potentials exist between the central cores of the cables, transformers at substations having their primary windings connected with the innermost cores of said cables, and highly inductive windings on the last said transformers having connections with the various cores of the cables whereby the cables will be fed with charging current at reduced potentials from said innermost cores.

8. In multiple voltage high-tension alternating-current transmission systems, comprising triple concentric cored cables and a source of electrical energy supplying current thereto, the highest voltage being imposed upon the central cores thereof and a six-phase system is superimposed thereon so that the intermediate and outer cores are working at respectively lower voltages whereby the greatest differences in potentials exist between the central cores of the cables, a transformer connected with said cables having its primary windings fed from the central cores thereof, highly inductive windings on said transformer corresponding with the phases between the cores of the cables, and connections between said windings and the various cores of the cables whereby the cables will be fed with charging current at reduced potentials from said central cores.

9. In a multiple voltage high-tension alternating-current transmission system comprising concentric cored cables and a source of electrical energy supplying current thereto, the greatest difference in potentials existing between the innermost cores of different cables, transformers connected with said cables at intervals along the line having their primaries fed from the innermost cores thereof, highly inductive secondary circuits on said transformers, and connections between the various cores of the cables whereby charging current for the cores of the cables will be fed into them.

10. In a multiple voltage high-tension alternating-current transmission system comprising concentric cored cables and a source of electrical energy supplying current thereto, the greatest differences in potentials existing between the innermost cores of different cables, means for supplying charging current to the cores of said cables for a distance along the line from the transmitting point in the line, and means at intervals along the line for maintaining the correct phase relation between the phases of the currents in the cores of the cables and maintaining the currents at the sufficient and proper potentials and thereby supplying the cores of the cables with charging current to be fed in both directions along the line from said intervals.

In testimony whereof he affixes his signature.

ALFRED MILLS TAYLOR.